(12) United States Patent  (10) Patent No.: US 8,511,060 B1
Watts  (45) Date of Patent: *Aug. 20, 2013

(54) EXTERNAL COMBUSTION ENGINE WITH A GENERAL WHEEL ROTATION POWER MOTOR

(76) Inventor: Gene Watts, Apopka, FL (US)

( * ) Notice: Subject to any disclaimer, the term of this patent is extended or adjusted under 35 U.S.C. 154(b) by 76 days.

This patent is subject to a terminal disclaimer.

(21) Appl. No.: 13/310,081

(22) Filed: Dec. 2, 2011

Related U.S. Application Data

(60) Division of application No. 12/419,587, filed on Apr. 7, 2009, now Pat. No. 8,096,103, which is a continuation-in-part of application No. 11/881,667, filed on Jul. 28, 2007, now abandoned.

(60) Provisional application No. 60/835,312, filed on Aug. 3, 2006.

(51) Int. Cl.
  F02C 5/00 (2006.01)
  F02G 1/00 (2006.01)
  F02B 57/06 (2006.01)
  F02B 57/08 (2006.01)

(52) U.S. Cl.
  USPC .................. 60/39.6; 123/44 C; 123/44 D

(58) Field of Classification Search
  USPC .................. 60/39.6; 123/44 C, 44 D
  See application file for complete search history.

(56) References Cited

U.S. PATENT DOCUMENTS

| | | | |
|---|---|---|---|
| 650,906 A | 6/1908 | Perks | |
| 1,038,970 A | 9/1912 | Rydberg | |
| 1,041,519 A | 10/1912 | Seibak | |
| 1,053,414 A | 2/1913 | Ludwick | |
| 2,131,216 A | 9/1938 | Brooke | |
| 2,588,889 A | 3/1952 | Sherwood | |
| 3,555,814 A | 1/1971 | Morsell | |
| 3,672,458 A | 6/1972 | Mackerle | |
| 3,762,488 A | 10/1973 | Dammon | |
| 3,820,617 A | 6/1974 | Groff | |
| 4,276,951 A | 7/1981 | Smitley | |
| 4,721,177 A | 1/1988 | Qizhen | |
| 4,836,149 A | 6/1989 | Newbold | |
| 5,275,134 A | 1/1994 | Springer | |
| 5,291,731 A | 3/1994 | Duva | |
| 5,375,564 A | 12/1994 | Gail | |
| 5,772,225 A | 6/1998 | Brackett | |
| 6,094,915 A | 8/2000 | Negre | |
| 6,453,869 B1 | 9/2002 | Moore | |
| 6,779,334 B2 | 8/2004 | Teacherson | |
| 6,809,426 B2 | 10/2004 | Naar | |
| 6,863,141 B2 | 3/2005 | Weisz | |
| 6,971,342 B1 | 12/2005 | Grabbe | |
| 6,971,467 B2 | 12/2005 | Katsaros | |
| 7,185,557 B2 | 3/2007 | Venettozzi | |
| 8,096,103 B1 * | 1/2012 | Watts | 60/39.6 |

FOREIGN PATENT DOCUMENTS

WO  0111195  2/2001

* cited by examiner

*Primary Examiner* — Mary A Davis
(74) *Attorney, Agent, or Firm* — Brian S. Steinberger; Law Offices of Brian S. Steinberger, P.A.

(57) ABSTRACT

General Wheel Rotation Power Motor (GWRPM) systems, apparatus, devices and methods of using a pressure generation, storage and control element; a pressure conversion to rotational force unit with reverse and neutral capability and components to transfer said rotational force to a power accumulator/multiplier whereby useful rotational force can be applied to varied applications. Pressure can be generated from an internal combustion engine (ICE), a pressurized air source, and the like.

12 Claims, 9 Drawing Sheets

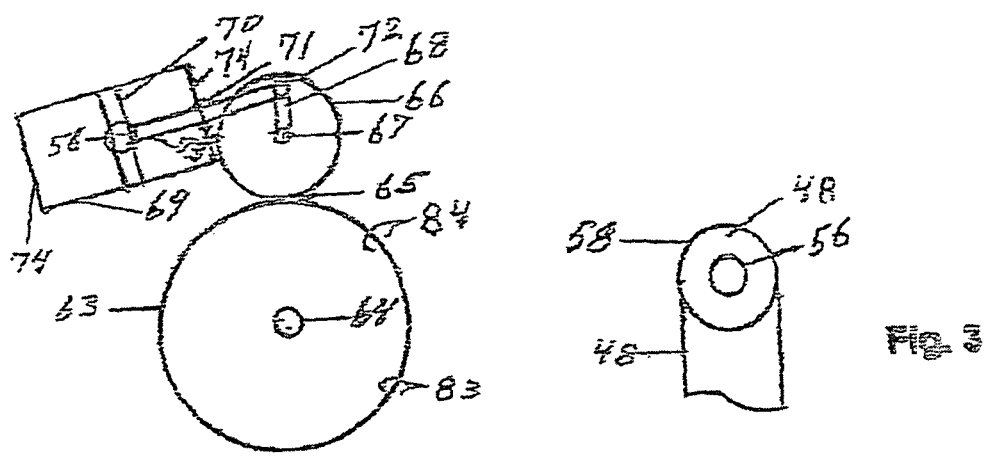
Fig. 4
Fig. 3
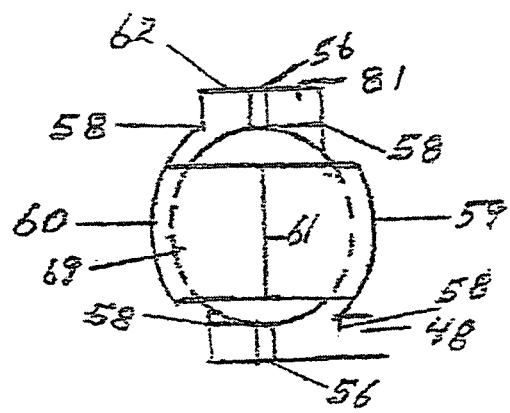
Fig. 5
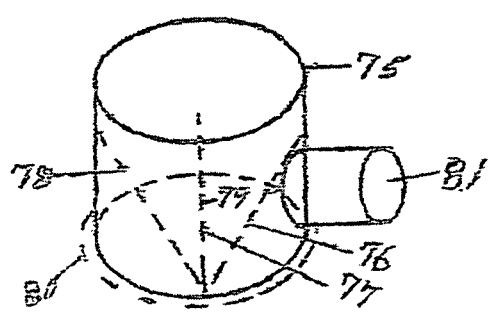
Fig. 6

EXTERNAL COMBUSTION ENGINE WITH A GENERAL WHEEL ROTATION POWER MOTOR

This application is a divisional application of U.S. patent application Ser. No. 12/419,587 filed on Apr. 7, 2009 now U.S. Pat. No. 8,096,103, now allowed, which is a Continuation-In-Part of U.S. patent application Ser. No. 11/881,667 filed Jul. 28, 2007 now abandoned, which claims the benefit of priority to U.S. Provisional Patent Application Ser. No. 60/835,312 filed Aug. 3, 2006.

FIELD OF INVENTION

This invention relates to motors, and in particular to systems, devices, apparatus and methods of using engines-motors that generate and/or use internal or external fluid pressure derived from fuel conversion for turning the pressure into rotational force.

BACKGROUND AND PRIOR ART

Motors with cylinder-piston-rod-crank are the popular method of converting pressure into rotational forces. These motors have essentially reached a maximum efficiency in the original internal combustion, four stroke configuration. The compression stroke diminishes the crankshaft torque and the articulating piston rod is inefficient as its direction of force is largely outside that of the piston. High compression ratios and extreme cylinder head pressures are applied with little initial effect on a crank that is parallel to the force direction. Over half of this high pressure has dissipated before the crank reaches its full effective length. This high pressure generation and containment requires large bulky engine blocks with special alloys and elaborate heat dissipation methods. Electronic controls for precise timing and fuel metering along with the use of alternative fuels and electric motor drives, innovative transmissions and differentials have allowed this system to reach its maximum efficiency.

Two stroke engines are more pollutive and less efficient and require high rpm/fuel use to produce effective torque. The only method that these engines have of increasing rotational force is the introduction of additional fuel/air into the cylinders and increasing the rpm per distance traveled through transmissions. i e, more fuel use.

Various types of external combustion engines exist that have a combustion expansion chamber. See U.S. Pat. No. 5,275,134 to Springer. This and similar efforts to convert force into torque have incorporated wobble and/or swash plates which are suited only for limited use and force. Springer describes a two stroke ICE(internal combustion engine) with oscillating cylinders with a separate intake and power pistons. One of the advantages cited is that of the piston rod being always aligned with the piston force, but again, the limitation of all force being applied to a central, small crankshaft.

U.S. Pat. No. 6,453,869 to Moore describes an ICE with variable crank ratio to extend dwell time at top dead center of firing/power stroke plus align piston rod more closely with force. The extra gear apparatus was costly to manufacture and added weight to engine and required extra maintenance. The Moore patent was cited in both U.S. Pat. No. 7,185,557 to Venettozzi; and U.S. Pat. No. 6,971,342 to Grabbe. The Venettozzi patent described altering the crank throw to an epitrochoidal effect and the Grabbe patent described changing the crank throw by bearing displacement mechanism. A primary problem again is the large, heavy block and all force applied to small crankshaft.

U.S. Pat. No. 4,276,951 to Smitley describes a vehicular energy storing system. Smitley describes a basic ICE, with the inefficient, bulky, weighty and encumbrances of a cooling system and transmission, that uses a process of converting fuel (gasoline) into gaseous pressure and transmits the pressure into rotational force that is manipulated (increased by additional rpm, or reversed) by a separate transmission and then divided by a differential before reaching the drive wheel axles. The rotational force begins inside a cylinder containing a piston and transmits this pressure to a rotatable crank. This "power stroke" is the third transit of the cylinder length by the piston in the 4 cycles required in the standard ICE used in vehicles today.

The fourth cycle begins after the power stroke when the still burning fuel mixture is forced out of the cylinder by the reverse movement of the piston. This pressure is estimated to be approximately 200 psi (down from 1000 psi+—at top dead center, TDC). This tremendous heat and pressure is required to give this process its peak efficiency in the ICE system, but is largely negated by the required strength and bulk of the containment members and elaborate cooling system.

The first cycle begins when the piston again reaches TDC as a valve opens and allows fresh air to be sucked into the cylinder by the downward movement of the piston. The second cycle begins when the piston again reverses direction and begins the compression stroke, reaching 10:1 ratio or more. Near TDC, an idle fuel volume is injected into this pressurized air and ignited, producing the power stroke. Two crank revolutions are required to produce these 4 cycles—one power stroke. The idle fuel volume is calculated to overcome the compression stroke and friction of the two crank revolutions. After starting, the ICE remains running, using one idle fuel volume for each two crank revolutions per cylinder. To accelerate the crank rpm, additional fuel is injected into the power stroke.

The ICE in the Smitley patent is limited to revolving in one direction only. The torque generated by the crankshaft is not sufficient to propel the vehicle without a gear and clutch system which multiplies the crank rpm delivered to the drive wheels. The ICE fuel to gaseous pressure process cannot tap and store vehicle inertia when braking to later aid in acceleration. The Smitley patent attempts to solve this problem and increase efficiency by harnessing the drive shaft rpm and direct this rotational force via a heavy gear and clutch system to a large and heavier flywheel which will rotate until its inertia is tapped via the gear system to aid in the acceleration of the drive shaft rpm.

In addition to the above cited patents, an experimental research team focused on the advantages of the variable stroke engine which can be found in APPLIED ENERGY, Vol. 77, Issue 4, on Apr. 4, 2004, pg 447-463.

Thus, the need exists for solutions to the above problems with the prior art.

SUMMARY OF THE INVENTION

A primary objective of the present invention is to provide systems, devices, apparatus and methods of using engines-motors that generate and/or use internal or external fluid pressure derived from fuel conversion for turning the pressure into rotational forces, which eliminates the need for extreme pressures/temperatures.

A secondary objective of the present invention is to provide systems, devices, apparatus and methods of using engines-motors that generate and/or use internal or external fluid pressure derived from fuel conversion for turning the pressure into rotational forces, which reduces the need for elaborate cooling systems, bulky-heavy support members and associated structures.

A third objective of the present invention is to provide systems, devices, apparatus and methods of using engines-motors that generate and/or use internal or external fluid pressure derived from fuel conversion for turning the pressure into rotational forces, which increases efficiency and work output.

A fourth objective of the present invention is to provide systems, devices, apparatus and methods of using engines-motors that generate and/or use internal or external fluid pressure derived from fuel conversion for turning the pressure into rotational forces, which reduces production costs and lessen repair needs.

A fifth objective of the present invention is to provide systems, devices, apparatus and methods of using engines-motors that generate and/or use internal or external fluid pressure derived from fuel conversion for turning the pressure into rotational forces, which reduces prior art limitations associated with heat, vibration, pollution, noise and other application drawbacks.

The novel General Wheel Rotation Power Motor (GWRPM) overcomes the prior art limitations due to unique elements and configuration systems, devices, apparatus and methods which eliminates the need for extreme pressure/temperature thereby reducing the need for elaborate cooling systems, bulky-heavy support members and associated structure, while increasing efficiency and work output. The simplicity of the invention reduces production costs and lessens repair needs. The adaptability of the elements to unique tasks/locations can also solve the prior art limitations associated with heat, vibration, pollution, noise and many other application drawbacks.

A preferred embodiment of the General Wheel Rotation Power Motor system can include:

a. a Pressure Generating-Control (PGC) element that contains the firing chamber which easily adapts to most fluid fuels and the adjacent insulated pressure chamber containment-release apparatus, where complete combustion can occur, and a pressure regulator valve that releases regulated pressure into and is delivered to the cylinder head via an insulated pressure manifold device.

b. a Pressure Conversion Unit (PCU) containing the cylinder, piston, rod and crank (Power Wheel). 1. The cylinder can have oscillating component in order to stay longitudinally aligned with the crank movement. 2. The piston, located within the cylinder, can have double acting member with pressure surfaces in both faces. 3. The piston rod can be rigidly attached to the center of one piston face and extends beyond the end of the cylinder where it passes through bearings component attached to the cylinder and then connects to a rotatable crank. 4. The crank component is located within and protrudes from one surface of a disc which can be used to move the crank along the length of the disc radius. This is referred to as the Power Wheel (PW). The disc can have a geared perimeter surface which can be used to transfer its rotational force to appropriate applications.

c. a Power Accumulator Rim/cylinder (PAR) is one appropriate application which can use a geared rim/cylinder component to which the PW meshes and transfers the PW rotational force. The rim can have a drive shaft component attached to its center of rotation to transport this rotational force where needed. In this configuration, the rotational force applied to the rim can be multiplied by the length of the rim radius and this increased force is applied to the said drive shaft component. This mechanical advantage has the effect of having a crank arm the length of the rim radius. This force multiplier allows for the reduction of pressure requirements and the resulting advantages mentioned above regarding the advantages of the GWRPM system.

An additional PCU element can be applied to the rim to increase rotational force applied to the rim depending on application rotational force requirements. The use of the double acting piston member (having the effect of two power strokes for each power wheel, PW, rotation) can also significantly increase the rotational force of each PCU when needed.

The power wheel, PW, component to move the crank from PW center of rotation (referred to as "neutral", with no piston travel) to the PW perimeter allows for fresh air pressurization during braking, utilizing appropriate valve manipulation means as the crank is moved from neutral by the PW crank control. When appropriate, (reduced torque requirements etc.,) during operation, the crank can be moved away from the PW perimeter (referred to as "full throw") which shortens the piston travel. With precise appropriate exhaust valve opening components, pressure conservation (efficiency) would be increased with only slight torque reduction.

Further objects and advantages of this invention will be apparent from the following detailed description of the presently preferred embodiments which are illustrated schematically in the accompanying drawings.

BRIEF DESCRIPTION OF THE FIGURES

FIG. 3 shows an insulated pressure manifold surrounding cylinder bearing and pressure containment components.

FIG. 4 shows pressure conversion unit element basic parts that include an oscillating cylinder, double acting piston with fixed rod, rod bearing(s), crank within the power wheel and the power accumulator rim.

FIG. 5 shows an end view of the cylinder with pressure manifold jacket for both intake and exhaust.

FIG. 6 shows an embodiment of exhaust fresh air cylinder head connection with flapper valve.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

This invention is a Continuation-In-Part of U.S. patent application Ser. No. 11/881,667 filed Jul. 28, 2007, which claims the benefit of priority to U.S. Provisional Patent Application Ser. No. 60/835,312 filed Aug. 3, 2006, all of which are incorporated by reference.

Figure 1:
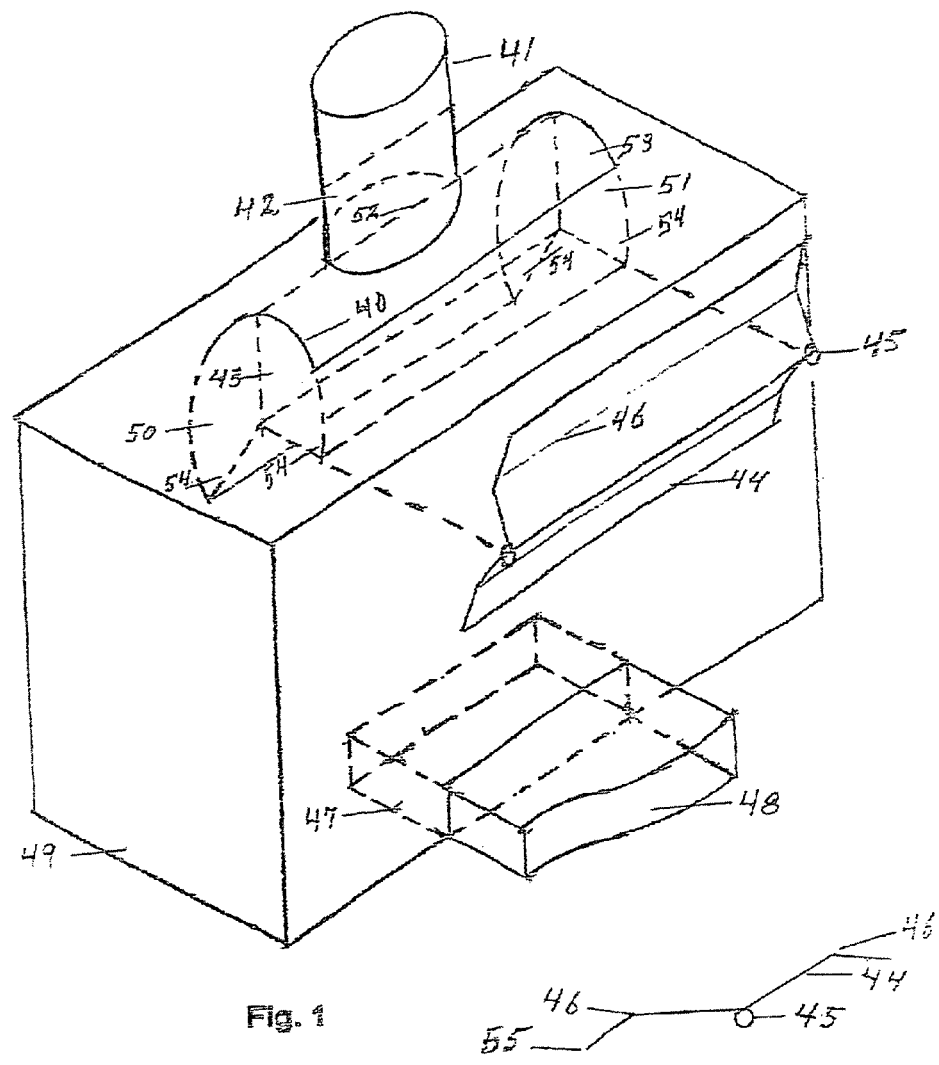
FIG. 1 shows an embodiment of a firing chamber, pressure containment and release element.
Figure 8:
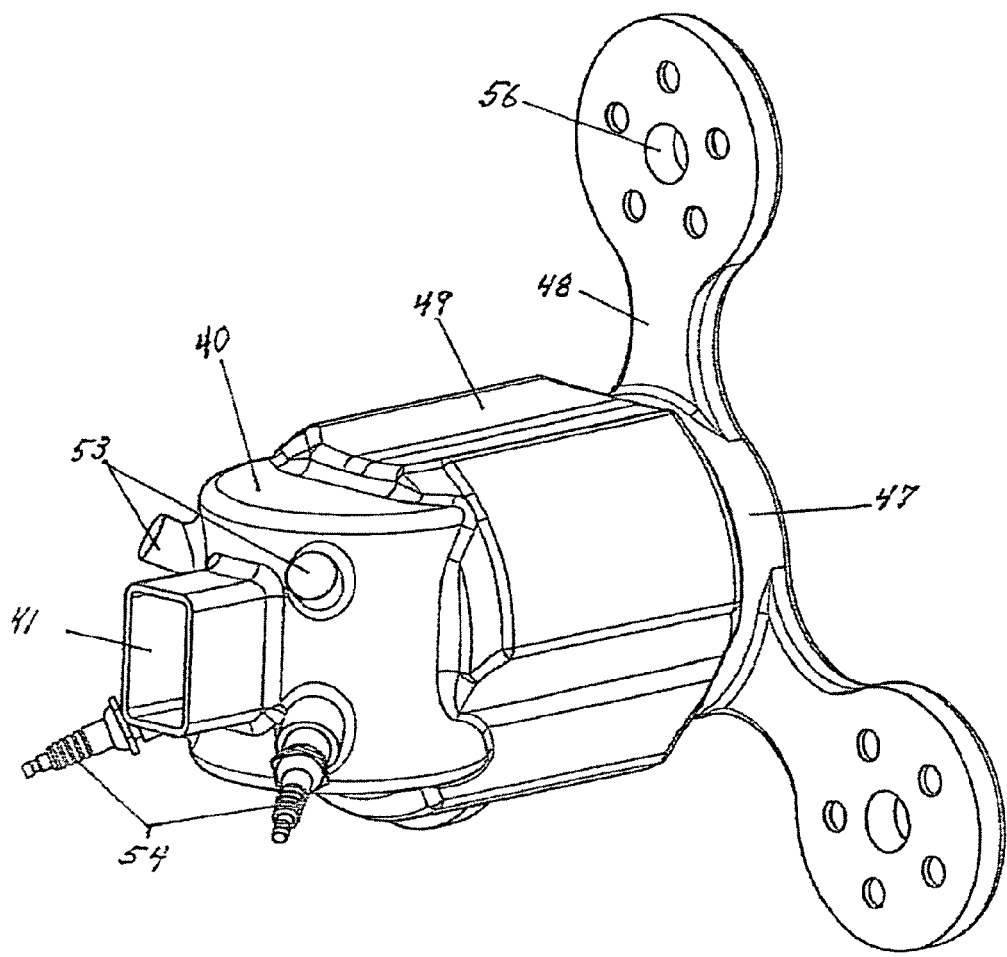
FIG. 8 shows another embodiment of a dual firing chamber with spark plugs, fuel injectors, pressure chamber, pressure regulator and pressure manifold.
Figure 9:
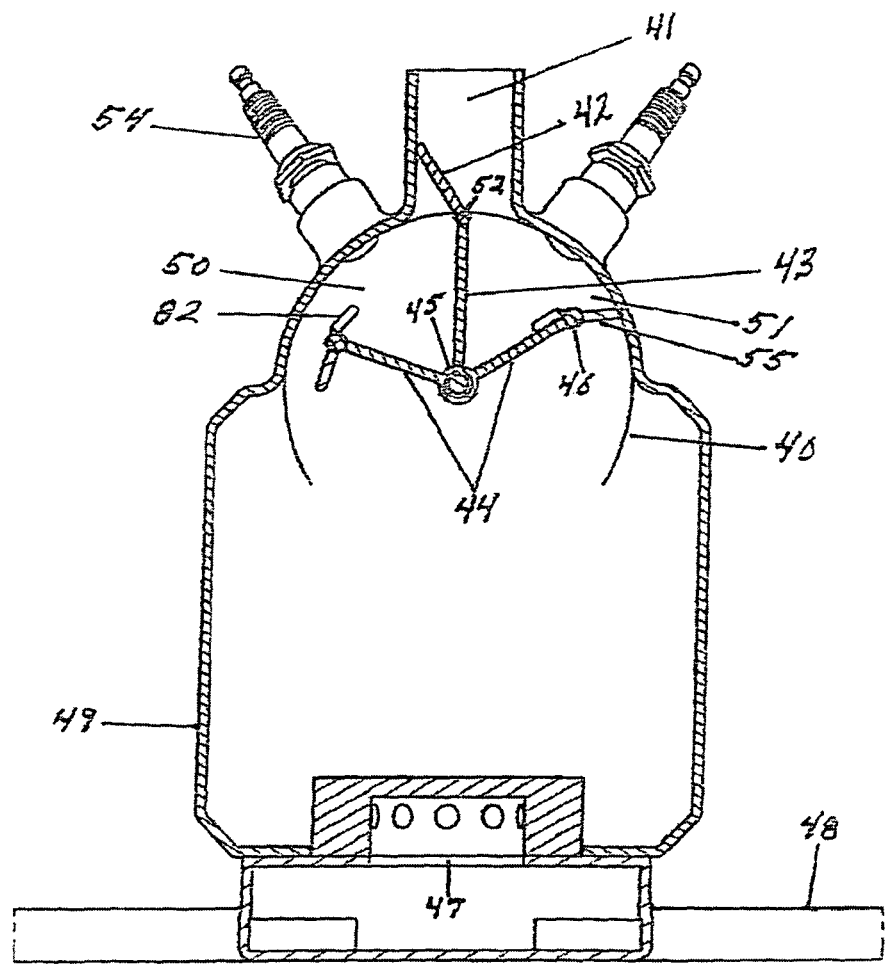
FIG. 9 shows a side view of dual firing chambers and pressure chamber and pressure regulator within the manifold of FIG. 8.

A listing of components will now be described.
- 40 firing chamber, right and left chambers
- 41 firing chamber fresh air inlet
- 42 flapper valve
- 43 firing chamber partition
- 44 reciprocating firing chamber walls
- 45 reciprocating firing chamber walls bearings/axis of rotation
- 46 reciprocating firing chamber wall offset section bearing/axis
- 47 pressure regulator release valve
- 48 insulated pressure manifold
- 49 insulated pressure container
- 50 left firing chamber
- 51 right firing chamber
- 52 firing chamber fresh air inlet flapper valve axis
- 53 portion of firing chamber where fuel injection components are located, lying outside pressure chamber
- 54 igniters
- 55 firing chamber wall offset
- 56 cylinder bearing
- 58 pressure seal (piston ring type)
- 59 insulated pressure manifold cylinder jacket attached to cylinder heads
- 60 exhaust manifold cylinder jacket attached to cylinder heads showing exhaust exit around cylinder bearing
- 61 cylinder head division for exhaust and pressure on opposite sides of the cylinder containing valves
- 62 exhaust outlet
- 63 power accumulator rim element (PAR)
- 64 drive shaft
- 65 geared surface
- 66 power crank wheel element (PW)
- 67 Power wheel bearing
- 68 variable crank track
- 69 oscillating cylinder
- 70 piston
- 71 piston rod bearing
- 72 crank pin
- 73 piston rod
- 74 cylinder head with valves—each end of cylinder
- 75 exhaust manifold
- 76 exhaust located fresh air flapper valve, (closed to fresh air inlet)
- 77 flapper valve of 76 in normal operation position, parallel to air flow
- 78 flapper valve of 77 in closed to exhaust position
- 79 bearing/axis of said flapper valve
- 80 exhaust manifold connection to cylinder head
- 81 exhaust located fresh air inlet
- 82 tab to reset firing chamber wall offset to normal position
- 83 manipulator for control sieve movement(controls position of crank)
- 84 control sieve
- 85 crank slot
- 86 power wheel body
- 87 positioner wheels
- 88 rotatable crank ring
- 89 power wheel cover
- 90 support member for variable crank means, attaches to power wheel body
- 91 counter balance
- 92 crank holder and moving bar The pressure generating-control unit (PGC) element is shown in FIGS. 1, 8 and 9 which contains the firing chamber 40 and the left 50 and right 51 sections which are separated longitudinally by partition 43. Pressurized fresh air enters via inlet 41 and enters appropriate firing chamber section by fresh air flapper valve 42 which is hinged 52 on partition 43 edge. Rotating firing chamber wall 44 offset 55 captures fresh air which forces wall 44 rotation (fuel is injected 53 at this time) about its axis 45 as it fills firing chamber section. As this rotation begins, igniters 54 in opposite section begin fuel combustion forcing offset 55 to open and allow expanding gasses into pressure chamber 49 thru this longitudinal trough creating a jet effect and assisting in wall 44 rotation.

The offset 55 additional deflection is reset to normal position by tab 82 when it reaches partition 43. Both rotating walls are equally exposed to pressure in pressure chamber 49. This pressure generating process is repeated as pressure requirements dictate. The pressure regulator 47 releases desired pressure into insulated pressure manifold 48 whereby pressure is delivered to the cylinder heads 74(FIG. 4).

Figure 2:
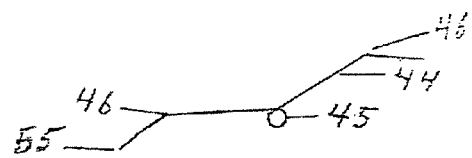
FIG. 2 shows an end view of reciprocating firing chamber walls of FIG. 1.

FIG. 2 shows an end view of reciprocating firing chamber walls of FIG. 1. FIG. 3 shows the insulated pressure manifold 48 as it surrounds the cylinder base and bearing 56 and the pressure containment seal means (similar to piston rings) as it continues on its way to the cylinder head.

FIG. 4 shows the pressure conversion unit (PCU) element in its simplest, basic configuration. As the pressure is delivered to the cylinder head 74 valves in the appropriate (depending on desired rotation direction) cylinder head 74 opens and the pressure performs work on the double acting piston 70 which pushes rod 73 connected to crank pin 72 thereby rotating power wheel 66 about its axis 67. This rotational force is transferred to the power accumulator rim PAR 63 via their commonly geared surfaces 65. This rotational force is multiplied by the radius length of the power accumulator rim 63 and concentrated on the drive shaft 64.

The rotational force of the drive shaft 64 can be doubled by the like application of a second pressure conversion unit PCU FIG. 4 to the PAR. Rotational force requirements will dictate the number of such PCU FIG. 4 applications and also the pressure psi released by the pressure regulator 47(FIG. 1). The PAR can also receive Pocus inside its rim with appropriate geared surfaces. A 21" diameter prototype with 3 PCUs located inside the PAR and surrounding a PGC element has been constructed. With only approximately 60 psi the 3 four inch double acting pistons produce over approximately 2000 pounds force via 7" diameter power wheel onto PAR rim which is the equivalent of approximately 22,000 pounds on the drive shaft with no need of a transmission.

FIG. 5 shows an end view of cylinder 69(of FIG. 4) with insulated pressure manifold 48 surrounding cylinder bearing 56 where pressure passes into insulated pressure cylinder jacket 59 via pressure sealed 58 rotational attachment. Pressure then enters the cylinder 69 via cylinder head 61 valves. Opposite end of the cylinder in FIG. 5 is same configuration except for the emergence of the rod 73 thru rod bearings 71 which appears in FIG. 4.

Referring to FIG. 5, exhaust gas is expelled around exhaust valves in exhaust side of the cylinder head 61 into exhaust jacket 60 and exits 62 around cylinder bearing 56 thru rotational sealed 58 connection. To utilize the braking of kinetic rotational force to produce fresh air pressurization, the exhaust outlet 62 can contain a fresh air inlet 81 and fresh air manifold (not shown) which can be connected to the exhaust side of both cylinder heads 61 utilizing a flapper valve 76 FIG. 6 which would allow exhaust valves in each cylinder head to remain in the open position during said braking and only utilizing the flapper valve 76, 78 to control fresh air in and out of the cylinder. The fresh air inlet 81 located in exhaust outlet 62 would be closed except when braking.

Figure 7:
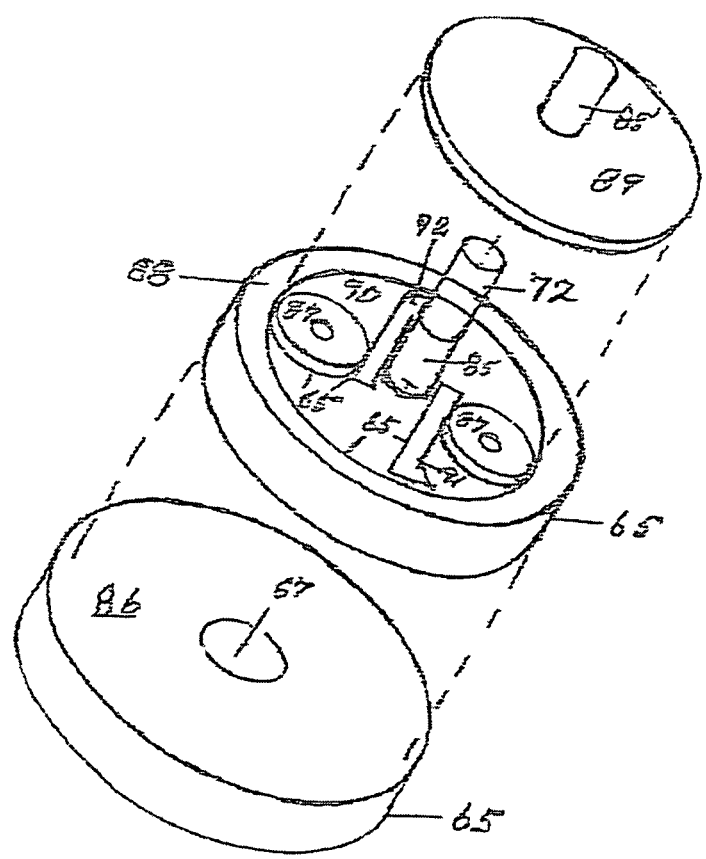
FIG. 7 shows power crank wheel with one embodiment to change crank position along radius of said power wheel.

The power (crank) wheel shown in FIG. 7 reveals one embodiment located in center support member 90 for moving the crank pin 72 to any point along the said power wheel radius. The power wheel rotates on its axle/bearing 67 and has a geared perimeter 65 for transferring rotational force. The support member 90 is fixed to the power wheel body 86 and is surrounded by a rotatable crank ring 88 with geared 65 inner and outer surfaces. The grooved outer surface 65 meshes with a control sleeve 84 that rotates with the rim 63 either inside or outside PAR depending on the location of power wheel 66. Said control sieve 84 is capable of rotation independent of the rim 63 and this rotation causes the crank ring 88 to rotate whereby its inside geared surface 65 meshes with and causes positioner wheels 87 to rotate and move crank bar 92 and crank pin 72 and counter balance 91 via common geared surfaces.

Figure 10:
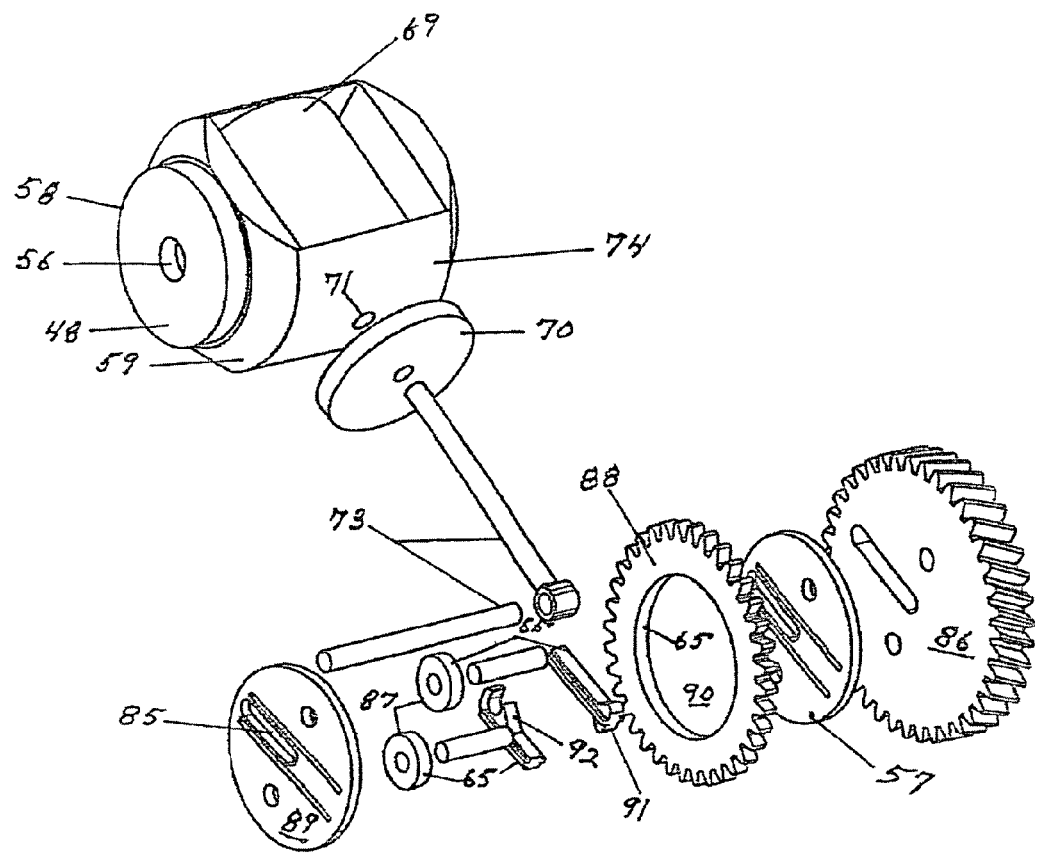
FIG. 10 shows a manifold surrounding the cylinder and cylinder bearings and an exploded view of piston rod and power wheel internal gears.
Figure 11:
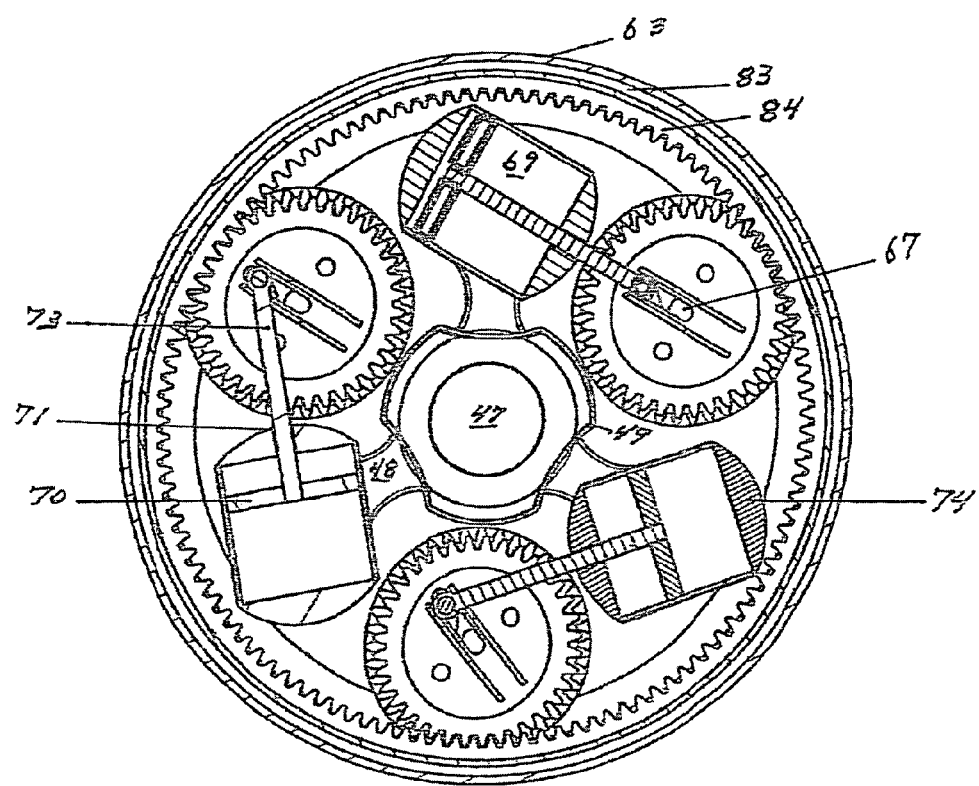
FIG. 11 shows a partial cut-away view of the hub with cylinders of FIG. 10 with pistons, rods, power wheel and gears.

FIG. 8 shows an embodiment of a dual firing chamber with plugs, fuel injectors, pressure chamber, pressure regulator and pressure manifold. FIG. 9 shows a side view of dual firing chambers and pressure chamber and pressure regulator within the manifold of FIG. 8. FIG. 10 shows manifold surrounding the cylinder and cylinder bearings and an exploded view of piston rod and power wheel internal gears. FIG. 11 shows a partial cut-away view of the hub with cylinders of FIG. 10 with pistons, rods, power wheel and gears.

Figure 12:
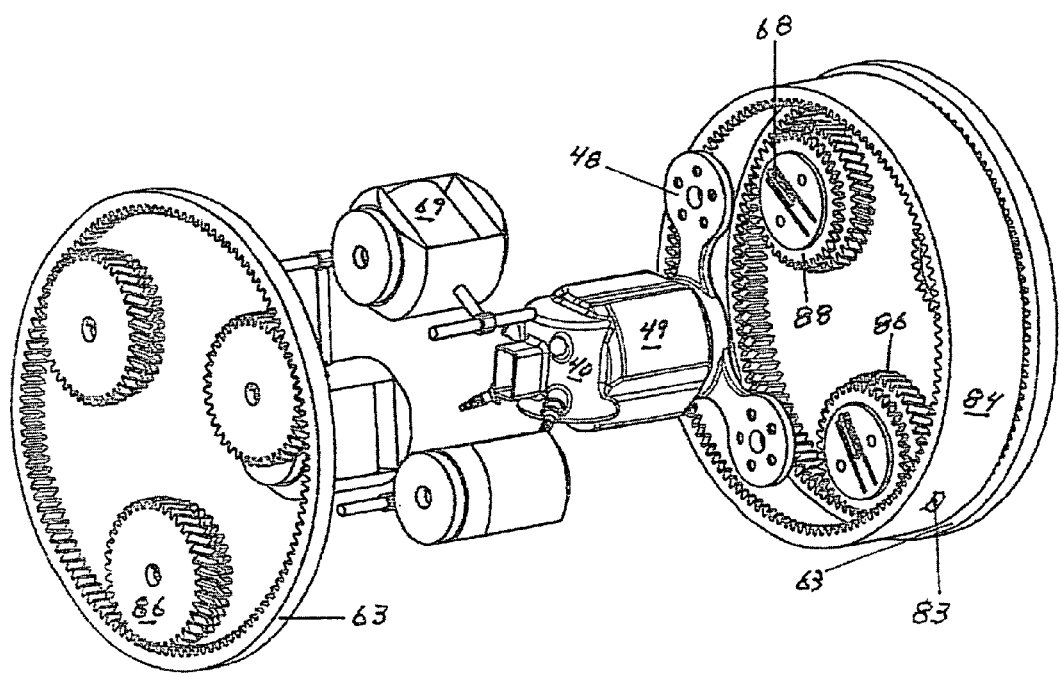
FIG. 12 shows an exploded view of a firing chamber of FIGS. 8 and 9, the cylinders and power wheels of FIG. 10.
Figure 13:
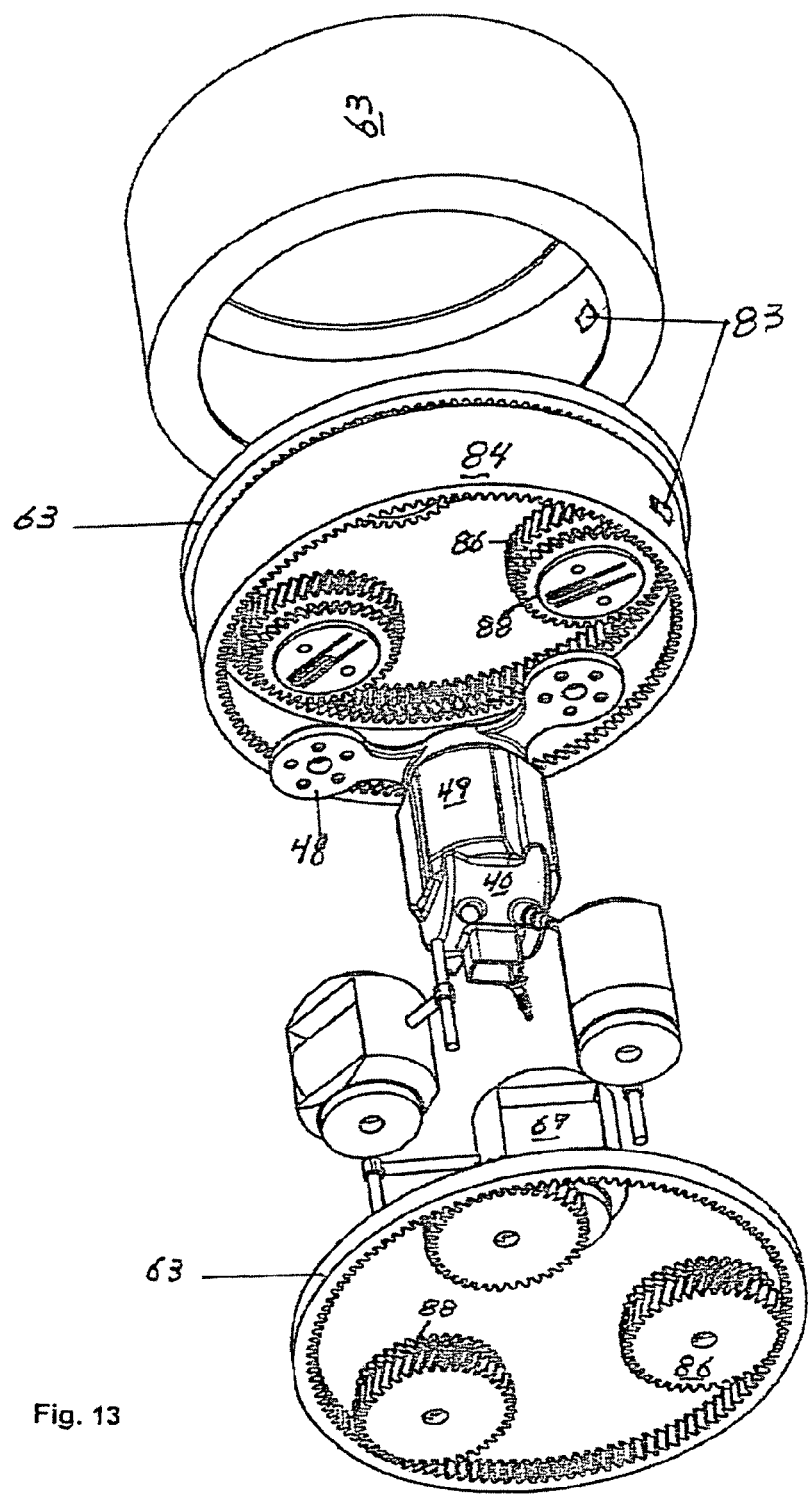
FIG. 13 is another perspective view of firing chamber, cylinders and power wheels of FIG. 12 with a rim that is used to surround the hub for wheel mounting applications.

FIG. 12 shows an exploded view of a firing chamber of FIGS. 8 and 9, the cylinders and power wheels of FIG. 10. FIG. 13 is another perspective view of firing chamber, cylinders and power wheels of FIG. 12 with a rim that is used to surround the hub for wheel mounting applications.

FIGS. 8-13 are contoured views of FIGS. 1-7. FIGS. 8 thru 13, depict each element into one embodiment of the GWRPM system which was referred to in previous FIGS. 1-7. Placing the elements inside the PAR required the reshaping of the contours of the Firing Chamber, FIG. 1, to fit into the center space, surrounded by the 3 oscillating cylinders. FIGS. 8-13 use the same component label numbering as the previous figures.

Referring to FIGS. 8-13, torque produced by the GWRPM system is a product of mechanical advantage (radius of PAR) and full application of pressure throughout crank rotation with the piston rod and cylinder always aligned with direction of force (oscillating cylinder) and constant supply of desired psi pressure from the pressure regulator valve located at the base of the firing chamber reservoir (PGC).

This high torque is not a result of high rpm, it is present instantly, zero rpm. With the use of the double acting piston (two power strokes per crank rotation) torque is nearly doubled. Valve manipulation (mechanical or computer) and type (sliding, flapper or butterfly) is left to the manufacturer and the application requirements. Efficiency is over three times that of ICE.

There is no idling and no large oil sump used in the invention. The low pressure requirements result in much lighter parts used, no cooling system, no transmission required. The unique variable crank (power wheel-crank) reduces the volume of pressure used per power stroke when torque requirements are lessened (cruising) and is in "neutral" when the crank is in the center of the power wheel (no piston travel).

This allows for fresh air pressurization during braking and coasting with no pressure consumed. Pressure and temperature containment methods are left to those skilled artisans as is the lubrication requirements.

Component 83 referred to in FIGS. 4, 12 and 13 refer to the component to move control sleve 84 which effects the positioning of the crank pin(s). This repositioning of 84 relative to rim 63 is dictated by the application necessities. Component 83 can be an electric motor and screw drive, spring loaded to full crank or neutral or other innovative components best suited for the job task.

The Operation: "Starting the engine" is accomplished by "cranking" an air compressor to achieve approximately 15 psi in a fresh air tank that is connected to the firing chamber inlet 41 FIG. 8. Placing the movement lever in "forward" sets the valves and the "footfeed" allows fresh air into firing chamber where a standard idle fuel charge is added into the approximately 15 psi fresh air, burned and released into reservoir resulting in approximately 200 psi. If this reservoir is at least the same volume as the cylinder, this will provide 4 power strokes at approximately 40 psi which produces over approximately 400 pounds of force (4" cylinder) on 21" PAR.

Three power strokes give one revolution of PAR on one fuel charge. In double acting piston mode, rotational force would be approximately 800 pounds and if the 10.5" PAR was turning a 1" shaft, the rotational force would be approximately 8,000 pounds on the shaft. This 1" shaft connected to a differential with a 1:2 ratio (one shaft rev produces two axle revs) would meet most common rotational force needs while being extremely efficient.

A comparison of the prior art device referenced in the background section to U.S. Pat. No. 4,276,951 to Smitley and the GWRPM system process reveals several specific advantages of the GWRPM:

1. Simplicity—less than $\frac{1}{10}$ the number of parts required and most components are "off the shelf". Inexpensive and noncomplicated construction.
2. Lighter: approximately 50% less bulk and weight of ICE and no transmission required. Supporting frame and suspension can be designed for safety rather than purely for support for the heavy ICE engine, transmission, cooling and braking systems.
3. Environmentally friendly: No idling motor, fuel/air mixture burns completely before being discarded. Amount of fuel injected remains constant enabling precise metering and control of mixture for clean burning.
4. Adaptability: completely adaptable torque system can be located in drive wheels or mounted on frame for front or rear drive. This allows for local customizing businesses to flourish and extend life of chassis, diminishing whole vehicle recycling.
5. Power: Exceeds that of high HP rated ICE by simply increasing the psi released into cylinder. Ex: approximately 40 psi released onto 4" piston produces approximately 480 pounds of rotational force on an approximately 21" rim using single action pistons and approximately 800 pounds using double action. This is equivalent to approximately 8,000 pounds of rotational force on a 1" drive axle.
6. Efficiency: Power and efficiency are the strong suits of the GWRPM process. There is no idling engine in this system, no high rpm (fuel use) to achieve required rotational force, no wasted heat because all pressure handling elements are insulated (heat=pressure retention). For comparison, an idling approximately 600 rpm 6 cylinder ICE consumes approximately 900 idle mixture volumes in approximately 30 seconds.

The GWRPM system injects one idle fuel volume into one side of the combustion chamber containing fresh air at approximately 14.7 psi (gauge) that becomes approximately 200 psi when burned and released into the pressure chamber (approximately 75 cu in). This volume equates to one cylinder volume in one embodiment containing 3 cylinders (6 cylinder in double action mode) and 7" crank discs inside a 21" diameter rim.

This approximately 200 psi is 5 cylinder volumes at approximately 40 psi. Three of these volumes will rotate the rim once, a distance of approximately 7.59° with a 4" tire mounted on the rim with approximately 480 pounds of rotational force on the rim perimeter. A second such fuel injection in the other side of the combustion chamber produces another approximately 200 psi into the remaining approximately 80 psi in the pressure chamber (pc) resulting in 7 cylinder volumes at approximately 40 psi or two additional wheel revolutions for a total distance traveled (tdt) of approximately 22.79° on two idle fuel volumes (ifv).

The 3rd ifv gives approximately 30.36° tdt, 4th ifv gives approximately 45.54° tdt, 5th ifv gives approximately 60.72° tdt, 6th ifv gives approximately 68.31° tdt, 7th ifv gives approximately 83.49° tdt, 8th ifv gives approximately 98.67° tdt, 9th ifv gives approximately 106.26° tdt, the 10th ifv gives approximately 121.44° tdt at approximately 480 pounds rim rotational force with approximately 80 psi remaining in the pc. Considering losses, assume approximately 100' of travel using only approximately 10 ifvs. This equates to one mile traveled using approximately 528 ifvs at approximately 40 psi (approximately 480 pounds rotational force on rim) or two miles at approximately 20 psi (approximately 156 pounds rotational force on rim) or 4 miles traveled using approximately 20 psi at ½ crank throw (½ pressure volume used at 120 pounds force on rim).

The fuel to rotational force process used in the GWRPM system achieves substantially greater work output in a very simple, light, more powerful and efficient machine than the ICE and its add ons. The GWRPM system greatly exceeds the results achieved by the Smitley invention by a new process to convert fuel into gaseous pressure and that pressure directly into variable, reversible rotational force in the drive wheel or into a differential powering 2 axle shafts. This process utilizes an external combustion and pressure storage unit with regulated pressure release valve into a unique combination of elements, which provide mechanical advantage to allow the use of relative low pressure to produce greater rotational force thereby reducing the bulk, weight and eliminating the need for elaborate cooling and transmission systems.

The General Wheel Rotation Power Motor (GWRPM) is readily adaptable to most rotational force/torque needs due to its simplicity of design, parts used, and also the ease of configuration, size modification. The PGC element is adaptable to most fluid fuels by modifying the firing chamber means where necessary and the ease of replacing it to accommodate other fuel applications including steam. The rotational force is totally controllable from power output to reversibility to neutral by the option of controlling psi applied to the piston, size of piston, crank position in the power wheel, use of double acting piston feature, addition of other PCU elements to the PAR element whereby this rotational force is multiplied by the length of the PAW radius.

PCU elements can be located inside PAR and used as an independent drive wheel with appropriate tire mounted thereon. Imagination is the only limitation to the uses of the GWRPM since we have not been accustomed to thinking of a power source without massive bulk, weight, cooling system, noise and pollution, commonly associated with the internal combustion engine (ICE).

Calculations show the GWRPM system to be at least three times more efficient than the ICE based on fuel/air/mix/firing (FAMF) per power stroke due to low pressure requirements of the GWRPM. Additional fuel savings occur since there is no "idling motor" or large oil pan.

The ICE, transmission, differential and support system, contributes over a third of the weight of our current passenger vehicles. With this weight and bulk removed by the use of the GWRPM system, the lighter vehicle could be made more safe and more customizable, opening the door for numerous small businesses in every community.

The subject invention can be used with pressurized air as a power source using the same components. The source can include but is not limited to a pressurized air cylinder injected directly into the firing chamber eliminating the need for fuel. The problem with current small cars such as the Nano™, is low power. The subject invention can create a high power source for small/compact cars, and the like.

A uniqueness of this invention comes from where the rotational force is applied (the rim) and the variable crank. The radius of the rim is a multiplier of the force at the axle and the neutral of the variable crank enables a transmission like operation. Up to this point the power source has been only burning fuel but the system seems to be made for a pressurized air propellant in combination with electric arc heating of the pressurized air which would greatly increase the pressure and enable great economy of the stored air source. The electricity could be generated at the rim and hub in standard fashion and stored in batteries. With permanent magnets in the rim and electromagnets in the hub periphery electricity could be generated as needed as well as at braking. The drum radius would allow for a large area of excitability.

Hub diameter and depth with matching rim can provide a platform for a full spectrum of rotational force producing sources. Gasoline was the first source envisioned and accommodated into the design. The second source is pressurized air with no fuel usage. Explosive pressure increase of this gas can be realized with an electric arc in the firing chamber. This will greatly increase the economy of the stored gas. The third source of rotational power can be the generator/motor imbedded in the hub periphery and inner rim.

The invention can use high pressure air storage as a power source and electrical power generation and use as a heat and power source, unique to the large diameter hub and rim.

The GWRPM (General Wheel Rotation Power Motor) will remove the energy consuming "middlemen" (transmission) that increases rpm to achieve torque requirements by releasing pressure to the cylinders to meet torque requirements.

As a complete package GWRPM, the hub diameter and depth with matching rim, provides a platform for a full spectrum of rotational force producing sources. Gasoline was the first source envisioned and accommodated into the invention.

As mentioned, the second source can be pressurized air with less fuel use. Explosive pressure increase of this released and expanding sub-freezing air can be achieved by introducing an electric arc into this gas in the firing chamber.

A third source of rotational power can be a generator/motor, with permanent magnets imbedded in the rim and electromagnets in the hub periphery where the diameter of the hub will multiply and force produced.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A general wheel rotation power motor for an external combustion engine system comprising:
 a dual firing chamber including an air intake for solely allowing fresh air into the dual firing chambers, a fuel storage supply having dual fuel injection connections for metering fuel into each chamber of the dual firing chamber and a dual igniter to alternately ignite the metered fuel inside of each of the dual firing chambers;
 a pressure storage chamber to store pressure generated in the dual firing chamber;
 an oscillating cylinder containing a double acting piston being driven by the generated pressure in the pressure storage chamber; and
 a rotatable crank driven by the double acting piston for rotating a geared crank power wheel; and
 a geared power accumulator rim rotated by the geared crank power wheel.

2. The wheel rotation power motor system of claim 1 wherein the dual firing chamber includes a rotating firing chamber wall offset to alternately direct the fresh air into each of the dual firing chambers and release expanding gasses into the pressure storage chamber and causing rotation of the rotating firing chamber wall for each next combustion cycle.

3. The system of claim 2, wherein the oscillating cylinder remains longitudinally aligned with movement of the geared crank power wheel, the double acting piston located within the oscillating cylinder having pressure surfaces in both faces, the piston rod is rigidly attached to a center of one piston face and extends beyond the end of the oscillating cylinder where it passes through a beatings component attached to the oscillating cylinder and then connects to the rotatable geared crank power wheel via a crank pin movable in a crank slot of the geared crank power wheel which is used to rotate the geared crank power wheel.

4. The system of claim 2, wherein the power accumulator rim has a drive shaft component attached to its center of rotation to transport the rotational force, wherein the rotational force applied to the power accumulator rim is multiplied by the radius of the power accumulator rim so that increased force is applied to the drive shaft component.

5. The wheel rotation power motor system of claim 1 wherein the oscillating cylinder comprises:
 a cylinder head intake and exhaust valve at opposite ends of the oscillating cylinder.

6. The wheel rotation power motor system of claim 5 wherein the geared crank power wheel comprises:
 a center support member fixedly attached with the power wheel body and surrounded by a rotatable crank ring having geared inner and outer peripheral surfaces to move a crank pin connecting the rotatable crank with the double acting piston along a radius of the geared crank power wheel;
 a geared positioning wheel meshed with the inner geared surface of the rotatable crank ring to move the crank pin; and
 a power wheel cover with the rotatable crank extending a distance therefrom covering an opposite end of the center support member.

7. The wheel rotation power motor system of claim 1 further comprising:
 a pressure conversion unit connected with a pressure regulator relief valve located between an output of the pressure storage chamber and the pressure conversion unit.

8. A method of converting pressure to rotational force with an external combustion engine comprising the steps of:
 solely inputting fresh air into a dual firing chamber;
 metering fuel from a fuel storage supply alternately into each chamber of the dual firing chamber;
 alternating ignition of the fuel inside of each chamber of the dual firing chamber;
 releasing the pressure generated in the dual firing chamber into a pressure storage chamber;
 regulating release of the stored pressure into an insulated manifold of an oscillating cylinder to achieve a desired torque;
 driving a double acting piston with the regulated pressure;
 rotating a geared crank power wheel by the driving double acting piston; and
 transferring the rotational force from the geared crank power wheel to a geared power accumulator rim.

9. A method for wheel rotation power for an external combustion engine system comprising:
 allowing fresh ambient air into a dual firing chamber via an air intake;
 metering fuel from a fuel storage supply into each chamber of the dual firing chamber;
 alternately igniting the metered fuel inside of each of the dual firing chambers;
 storing pressure generated in the dual firing chamber in a pressure storage chamber;
 driving a double action piston of an oscillating cylinder by the generated pressure in the pressure storage chamber; and
 driving a rotatable crank with the double acting piston for rotating a geared crank power wheel; and
 rotating a geared power accumulator rim rotated by the geared crank power wheel.

10. The method of claim 9 further comprising the step of:
 rotating a firing chamber wall offset in the dual firing chamber to alternately direct the fresh air into each of the dual firing chambers; and
 releasing expanding gasses into the pressure storage chamber to rotate the rotating firing chamber wall for each next combustion cycle.

11. The method of claim 9 further comprising the step of:
 regulating pressure released from the pressure storage chamber via a pressure regulator relief valve between an output of the pressure storage chamber and a pressure conversion unit.

12. The method of claim 9, further comprising the step of:
 attaching a drive shaft component to the power accumulator rim center of rotation to transport the rotational force, wherein the rotational force applied to the power accumulator rim is multiplied by the radius of the power accumulator rim so that increased force is applied to the drive shaft component.

* * * * *